(12) United States Patent
Agnew et al.

(10) Patent No.: US 9,327,699 B2
(45) Date of Patent: May 3, 2016

(54) METHOD FOR REDUCING REVERSE VEHICLE STOPPING DISTANCE USING BRAKE PRE-CHARGE

(71) Applicant: Continental Automotive Systems, Inc., Auburn Hills, MI (US)

(72) Inventors: David Leslie Agnew, Clarkston, MI (US); Graham Lanier Fletcher, North Augusta, SC (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/603,439

(22) Filed: Jan. 23, 2015

(65) Prior Publication Data

US 2015/0210259 A1    Jul. 30, 2015

Related U.S. Application Data

(60) Provisional application No. 61/933,047, filed on Jan. 29, 2014.

(51) Int. Cl.
| | |
|---|---|
| *A01B 69/00* | (2006.01) |
| *B60T 13/66* | (2006.01) |
| *B60T 7/22* | (2006.01) |
| *B60T 8/17* | (2006.01) |
| *B60T 13/14* | (2006.01) |

(52) U.S. Cl.
CPC .............. *B60T 13/662* (2013.01); *B60T 7/22* (2013.01); *B60T 8/17* (2013.01); *B60T 13/14* (2013.01); *B60T 2201/022* (2013.01); *B60T 2201/12* (2013.01); *B60T 2230/08* (2013.01)

(58) Field of Classification Search
None
See application file for complete search history.

(56) References Cited

FOREIGN PATENT DOCUMENTS

| | | |
|---|---|---|
| DE | 102004057603 A1 | 4/2006 |
| DE | 102009027656 A1 | 1/2011 |
| JP | 1086805 A | 9/1998 |
| JP | 2004522967 A | 11/2004 |
| JP | 2007230327 A | 9/2007 |
| JP | 2007245984 A | 9/2007 |
| JP | 2013124060 A | 6/2013 |
| WO | 03006290 A1 | 1/2003 |

OTHER PUBLICATIONS

Search Report dated Jun. 29, 2015, from corresponding European Application No. 1515299.9.
English Translation of Japanese Office Action mailed Dec. 21, 2015.

*Primary Examiner* — Adam Alharbi

(57) ABSTRACT

An automatic braking system for a vehicle is disclosed and includes an electronic brake system capable of applying wheel brakes to decelerate the vehicle and a controller. The controller includes instructions for maintaining the electronic brake system in a pre-charge condition when the vehicle is operating in a reverse gear, and applying the wheel brakes independent of a driver input.

14 Claims, 2 Drawing Sheets

METHOD FOR REDUCING REVERSE VEHICLE STOPPING DISTANCE USING BRAKE PRE-CHARGE

CROSS REFERENCE TO RELATED APPLICATION

This application claims priority to U.S. Provisional Application No. 61/933,047 filed on Jan. 29, 2014.

TECHNICAL FIELD

The present disclosure relates to automotive vehicles, and more particularly to driver assistance systems for automotive vehicles.

BACKGROUND

Advancements in sensor technology have led to the ability to improve safety systems for vehicles. Arrangements and methods for detecting and avoiding collisions are becoming available. Such driver assistance systems use sensors located on the vehicle to detect an oncoming collision. The systems may warn the driver of various driving situations to prevent or minimize collisions. Additionally, sensors and cameras are used to alert the driver of possible obstacles when the vehicle is traveling in reverse. Such systems are especially useful for increasing safety in vehicles which operate under autonomous or semi-autonomous conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An automatic braking system for a vehicle includes an electronic brake system capable of applying wheel brakes to decelerate the vehicle and a controller. The controller includes instructions for maintaining the electronic brake system in a pre-charge condition when the vehicle is operating in a reverse gear; and applying the wheel brakes independent of a driver input. In one disclosed example, the pre-charge condition includes maintaining a pressure within the electronic braking system above a threshold pressure level sufficient to decelerate the vehicle.

A further example embodiment discloses a method of controlling a vehicle in reverse gear including the steps of maintaining a vehicle braking system in a pre-charge condition when the vehicle is operating in the reverse gear such that the pre-charge condition is sufficient to decelerate the vehicle and apply vehicle brakes with an automatic brake system, wherein the brake application occurs independent of a driver input.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The present disclosure will become more fully understood from the detailed description and the accompanying drawings, wherein.

DETAILED DESCRIPTION

Figure 1:
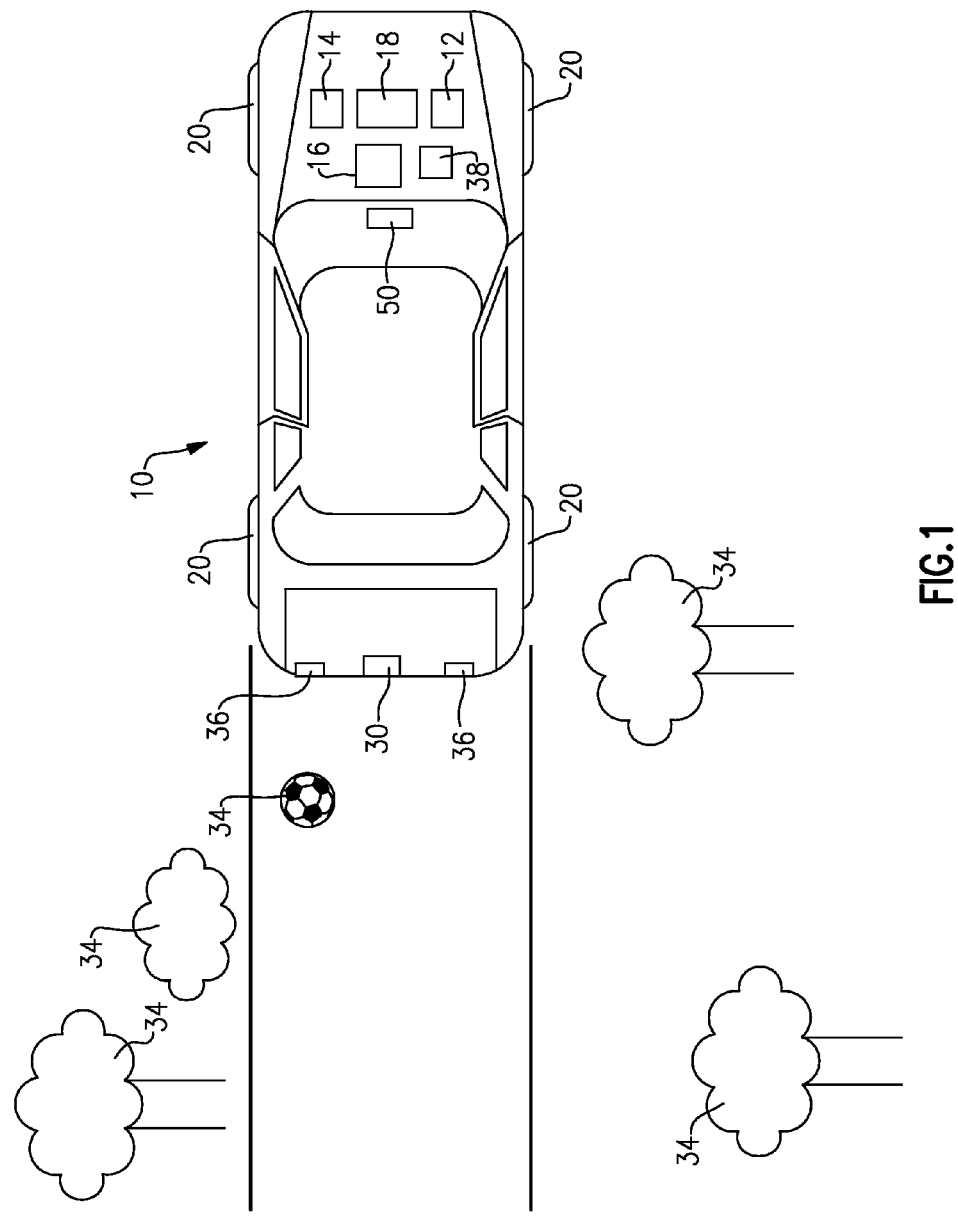
FIG. 1 is a schematic illustration of a top view of a vehicle utilizing a reverse collision avoidance system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a driver assistance system, in particular an automatic braking system 12, as explained in further detail below. The automatic braking system 12 may be used to brake a vehicle 10 during autonomous and semi-autonomous vehicle operations. In particular, the automatic braking system 12 may be used when the vehicle 10 is performing a reverse driving operation. Throughout the application the relative forward and reverse directions are in reference to the direction in which an operator for the vehicle 10 would primarily be facing when operating the vehicle 10.

The automatic braking system 12 may be used along with other safety systems, such as a reverse collision avoidance system 14 and an electronic brake system (EBS) 16. A common or separate controller 18 may be used by the systems 12, 14, 16.

When a reverse maneuver is performed with the automatic braking system 12 engaged, the automatic braking system 12 maintains a small braking pressure throughout the maneuver. That is, the example automatic braking system 12 instructs the EBS 16 to maintain a brake pre-charge. It should be understood that although a hydraulic braking system is disclosed by way of example, other systems for actuating a wheel brake such as for example, electric motors, or other devices are also within the contemplation of this disclosure.

Figure 2:
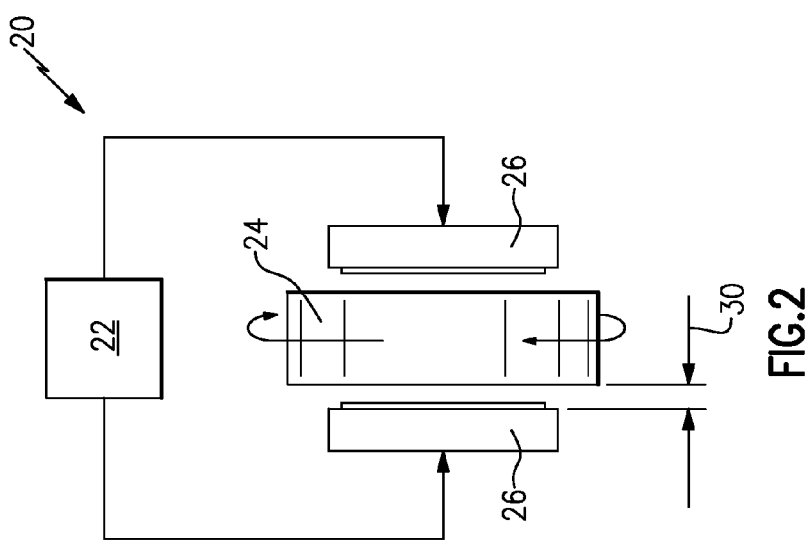
FIG. 2 is a schematic illustration of an example braking system in a normal operating position.

Referring to FIG. 2, a wheel brake 20 includes a rotating element 24, such as a rotor or brake drum that rotates with the vehicle wheel. A braking element 26 moves in response to the pressure within the EBS 16. During normal operation, a gap 30 is provided between the rotating element 24 and the braking element 26 to minimize friction and prevent any drag on the vehicle. During normal braking, the brake elements 26 must move across the gap 30 to engage the rotating element. Such movement requires time and can cause an abrupt application of braking force during certain braking maneuvers.

Figure 3:
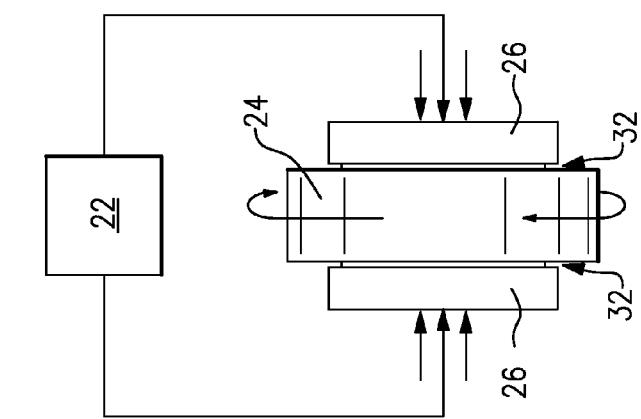
FIG. 3 is a schematic illustration of an example braking system in a pre-charge condition.

Referring to FIG. 3, when the vehicle 10 is placed in a reverse gear, the brake pre-charge exerts a pressure on the braking elements 26 sufficient to close the gap 30 and engage the rotating member 24. The actual braking force is minimal but still sufficient to slow the vehicle. The automatic braking system 12 and the EBS 16 continually adjust the brake pressure within the EBS 16 to keep the brake pressure at wheel brakes 20 of each individual wheel from falling below a threshold required to decelerate the vehicle 10. A pump 22 can be modulated to keep the pressure at a desirable threshold level. The pump 22 may be part of the EBS 16.

Figure 4:
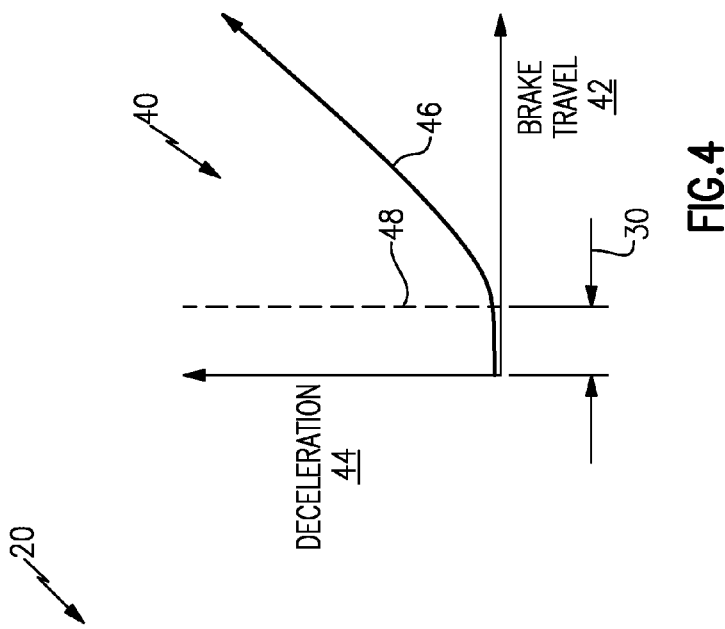
FIG. 4 is a schematic representation of the relationship between vehicle deceleration and brake travel.

Referring to FIG. 4 with continued reference to FIGS. 2 and 3, graph 40 illustrates the relationship between brake element travel 42 and vehicle deceleration 44. Initial pressurization provided by the initial pressure in the EBS 16 moves the brake element 26 though the gap 30 such that it engages the rotating element 24. This places the deceleration curve within a linear zone 46 where further travel of the brake element 26 results directly in deceleration of the vehicle 10.

Pressure within the EBS 16 is maintained above the threshold value indicated at 48 required to decelerate the vehicle 10. When the automatic braking system 12 determines the brakes 20 must be applied the EBS 16 uses the pressure within the brake lines to activate the wheel brakes 20, without a delay for pressure build-up and to cross any gap between the rotating element 24 and the brake element 26.

If braking intervention is required, the response from the vehicle 10 will be almost immediate since there will not be an initial build-up time required for the EBS 16. Impact on fuel economy should be minimal for brief back-up maneuvers typically performed by vehicles 10. By maintaining the initial brake pressure throughout the duration of a back-up maneuver, the time and distance required to stop the vehicle 10 can be significantly reduced.

Referring to FIG. 1, the automatic braking system 12 may be used to brake the vehicle 10 when using the reverse collision avoidance system 14. The reverse collision avoidance system 14 includes a camera 30 mounted to provide a view of a rear driving direction for the vehicle 10. The camera 30 may be a monocular camera, binocular camera, or another type of sensing device capable of providing a view of the rear travelling path of the vehicle 10. The camera 30 may be mounted in any location that provides a view of the rear driving path of the vehicle 10. A controller 16 may be connected to the camera 30 to analyze the image/data and identify objects 34 within the image that may be obstacles for the vehicle 10. In addition to the camera 30 the collision avoidance system 14 may use other systems and sensors to assist in identifying objects 34. Such systems and sensors may include, but are not limited to: proximity sensors 36, LIDAR, RADAR, ultrasound, GPS 38, radio sensors, etc.

As soon as the vehicle 10 is started and shifted into reverse, the backup collision avoidance system 14 is started. The controller 18 instructs the EBS 16 to actuate the pump 22 and provide a pre-charge such that the braking elements 26 engage the rotating element 24. Engagement is sufficient to induce a drag or decelerate the vehicle, but not sufficient to prevent movement of the vehicle. A warning is provided to a driver by a device 50 within the vehicle cabin when an obstacle is detected and at least one vehicle collision avoidance action is also provided when the probability that the object is determined to be an obstacle exceeds a predetermined threshold.

If the reverse collision avoidance system 14 detects that a collision with an obstacle seems likely one avoidance action may be to instruct the automatic braking system 12 to apply the brakes 20 to prevent the collision. The brake pre-charge will help to quickly apply the brakes 20 to give the driver time to react to a situation prior to intervention from the reverse collision avoidance system 14.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a vehicle in reverse gear comprising:
   maintaining a vehicle braking system in a pre-charge condition when the vehicle is operating in the reverse gear, wherein the pre-charge condition comprises maintaining a hydraulic pressure above a threshold hydraulic pressure value that provides a corresponding closure of a gap between a braking element and a rotating element of at least one wheel brake; and
   applying vehicle brakes with an automatic brake system, wherein the brake application occurs independent of a driver input.

2. The method of claim 1, further comprising controlling the vehicle steering and braking systems with a reverse collision avoidance system.

3. The method of claim 1, wherein applying the vehicle brakes with the automatic brake system further includes sending instructions to an electronic brake system to apply the vehicle brakes.

4. The method of claim 1, wherein maintaining the hydraulic pressure within the brake system is accomplished by using a brake pump.

5. The method of claim 1, wherein the threshold hydraulic pressure is sufficient to provide closure of the gap.

6. The method of claim 1, wherein the vehicle braking system continually adjusts the hydraulic pressure to maintain the hydraulic pressure at each of the wheel brakes above the desired threshold hydraulic pressure value.

7. An automatic braking system for a vehicle comprising:
   an electronic brake system capable of applying wheel brakes to decelerate the vehicle; and
   a controller including instructions for:
   maintaining the electronic brake system in a pre-charge condition when the vehicle is operating in a reverse gear, wherein the pre-charge condition comprises sufficient hydraulic pressure to close a gap between a braking element and a rotating element of at least one wheel brake; and
   applying the wheel brakes independent of a driver input.

8. The automatic braking system of claim 7, wherein the pre-charge condition comprises maintaining a hydraulic pressure within the electronic braking system above a threshold hydraulic pressure level sufficient to decelerate the vehicle.

9. The automatic braking system of claim 7, wherein the controller further includes instructions for requesting a vehicle braking operation when a reverse collision avoidance system determines a probability of a collision is above a predetermined threshold for autonomous vehicle intervention.

10. The automatic braking system of claim 8, wherein the threshold hydraulic pressure is sufficient to close the gap but not prevent movement of the vehicle.

11. The automatic braking system of claim 7, wherein the vehicle braking system continually adjusts the hydraulic pressure to maintain the hydraulic pressure at each of the wheel brakes above the desired value.

12. The automatic braking system of claim 7, wherein the braking element comprises a caliper and the rotating element comprises a rotor.

13. The method as recited in claim 1, wherein the vehicle braking system comprises a hydraulic brake system including a pump for maintaining the hydraulic pressure at a desired pressure.

14. The automatic braking system as recited in claim 7 wherein the electronic brake system includes a pump for maintaining a hydraulic pressure at a desired pressure.

* * * * *